H. A. STEVENS.
OAT SPROUTER.
APPLICATION FILED JUNE 5, 1918.

1,290,398.

Patented Jan. 7, 1919.

Inventor
Harry A. Stevens,
By Wm. O. Belt, Atty.

UNITED STATES PATENT OFFICE.

HARRY A. STEVENS, OF AURORA, ILLINOIS.

OAT-SPROUTER.

1,290,398.    Specification of Letters Patent.   Patented Jan. 7, 1919.

Application filed June 5, 1918. Serial No. 238,254.

*To all whom it may concern:*

Be it known that I, HARRY A. STEVENS, a citizen of the United States, residing at Aurora, in the county of Kane and State of Illinois, have invented certain new and useful Improvements in Oat-Sprouters, of which the following is a specification.

This invention relates to a device for sprouting oats for poultry feed and has for its primary object the provision of a simple and relatively inexpensive structure, collapsible to permit storage in a minimum space when not in use, readily set up when needed, movable from place to place as desired, and adapted to provide for sprouting the maximum quantity of oats in a unit of space and to sprout the oats in rotation so that the device may be used continuously.

Further objects and advantages of my invention reside in the various combinations hereinafter described and claimed as will be apparent as it is better understood by reference to the following specification when read in connection with the accompanying drawing, illustrating the preferred embodiment thereof, in which—

Figure 1:
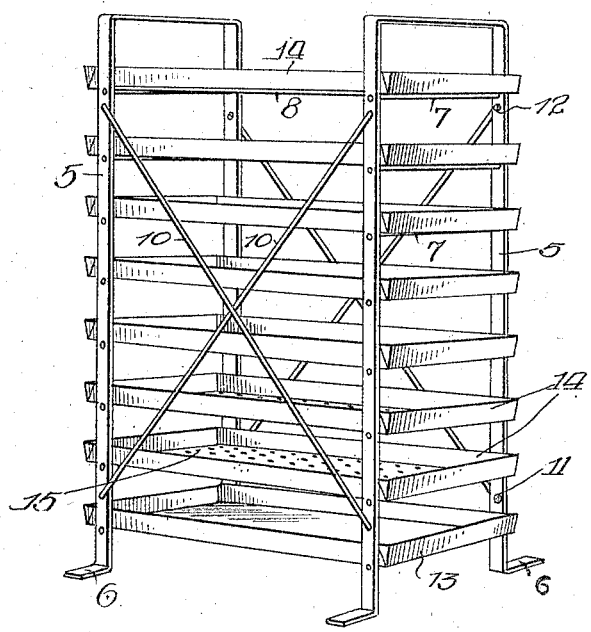
Figure 1 is a view in perspective of the invention.
Figure 3:
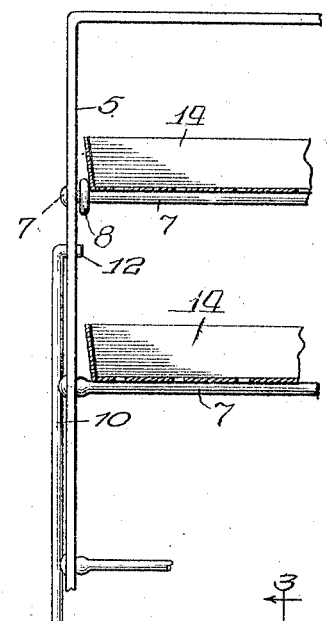
Fig. 3 is a section on the line 3—3 of Fig. 2.
Figure 2:
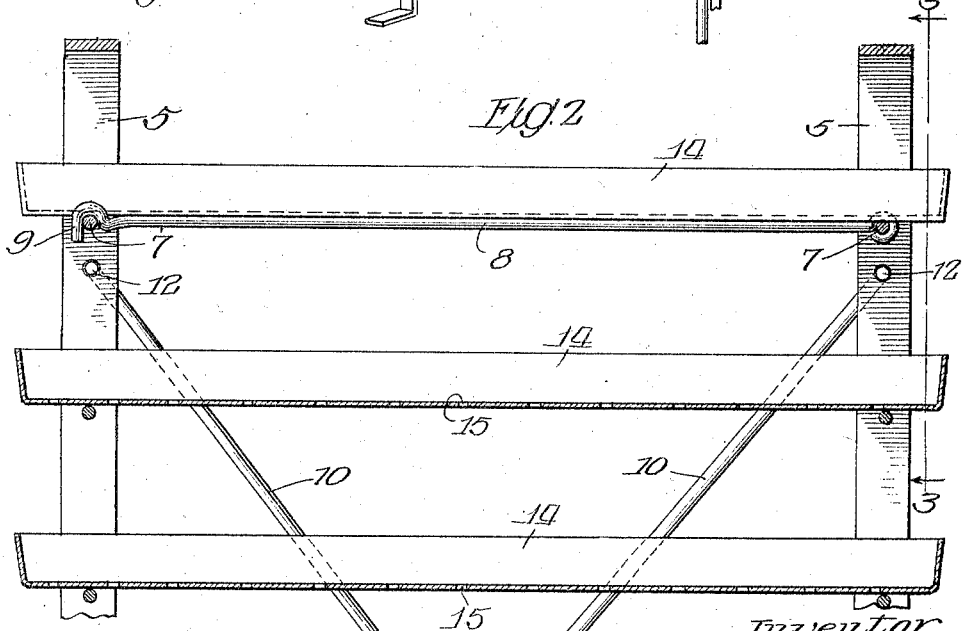
Fig. 2 is an enlarged detail in longitudinal section through a portion of the structure.

Referring to the drawing my invention comprises a collapsible support for a plurality of separate pans or receptacles in which the oats are sprouted. More specifically the support consists of a pair of U-shaped upright members 5, preferably constructed of strap iron, and having feet 6. Each of the U shaped upright members 5 is provided with a plurality of transverse rods 7 spaced vertically therein and securely riveted thereto. Two hooks 8 are connected to the uppermost rod 7 on one of the U shaped members 5 and are provided with hook shaped ends 9 adapted to embrace the uppermost rod 7 on the other U shaped member 5 to maintain the U shaped members in spaced relation. The structure is braced by diagonal rods 10 having their lower ends disposed through suitable openings in the legs of the U shaped members 5 adjacent the lower ends thereof and provided with heads 11 which prevent removal of the rods. The upper ends of the rods are provided with hook shaped ends 12 adapted to enter suitable openings in the legs of the U shaped members 5 adjacent their upper ends. Thus when assembled the U shaped members 5 are held and braced in the position indicated in Fig. 1 with the transverse rods 7 in alinement to support the sprouting pans or receptacles. The support is readily dismantled by withdrawing the hook shaped ends 12 from the openings in the legs of the U shaped members 5 and releasing the hook shaped members 9 from the rod 7. The device may then be compactly arranged for shipment or storage.

A plurality of pans or receptacles are provided the lowermost pan 13 being watertight while each of the pans 14 is provided with a plurality of holes 15 so that liquid applied in the uppermost pan of the series will pass downwardly through all of the pans, but is prevented from reaching the floor or surface upon which the device rests by the lowermost pan which catches all of the surplus water. The pans are constructed so that when removed from the device they may be nested and compactly shipped or stored with the support.

My invention results in numerous advantages. Any one of the pans may be removed and replaced without disturbing the others. The entire sprouter, being relatively light in weight, may be bodily moved from place to place as desired and when not in use, the entire structure may be quickly dismantled and easily stored. When needed it is as easily reassembled for use. The skeleton structure while sufficiently rigid for the purpose, permits access of air and sunlight to the oats in each of the pans so that the maximum efficiency in sprouting is obtained.

Various changes may be made in the form, arrangement and construction of the parts without departing from the spirit or scope of the invention or sacrificing any of its material advantages, the forms hereinbefore described being merely a preferred embodiment thereof.

I claim:

1. In an oats sprouter, the combination of a collapsible support consisting of spaced U shaped members, diagonal braces connecting said members and having one end separable therefrom to permit separation of said members, and a plurality of pans supported by said members.

2. In an oats sprouter, the combination of a collapsible support consisting of spaced U shaped members, longitudinal and diagonal braces connecting said members and disengageable therefrom to permit collapsing of the structure, and a plurality of pans supported by said members.

3. In an oats sprouter, the combination of a support consisting of spaced U shaped members, transverse rods connecting the legs of said members, hooks mounted on a transverse rod of one member and engaging a transverse rod on the other to maintain said member in spaced relation, and a plurality of pans mounted on said rods.

4. In an oats sprouter, the combination of a support consisting of spaced U shaped members, transverse rods connecting the legs of said members, hooks mounted on the uppermost transverse rod of one member and engaging the corresponding rod on the other member, diagonal braces connecting the legs of said members, and a plurality of pans supported on said rods.

5. In an oats sprouter, the combination of a support consisting of spaced U shaped members arranged in inverted position with their ends out-turned to form feet, transverse rods connecting the legs of said members, a plurality of pans supported on said rods, and diagonal braces secured at their lower ends to the legs of said members and provided at their upper ends with hooks to enter openings in said legs.

HARRY A. STEVENS.

Witnesses:
  MAYBELLE STEVENS,
  FRANK B. GARBE.

Copies of this patent may be obtained for five cents each, by addressing the "Commissioner of Patents, Washington, D. C."